Aug. 26, 1958  M. S. GASPARDO  2,849,073
TANDEM HITCH FOR FARM TRACTORS
Filed May 14, 1956
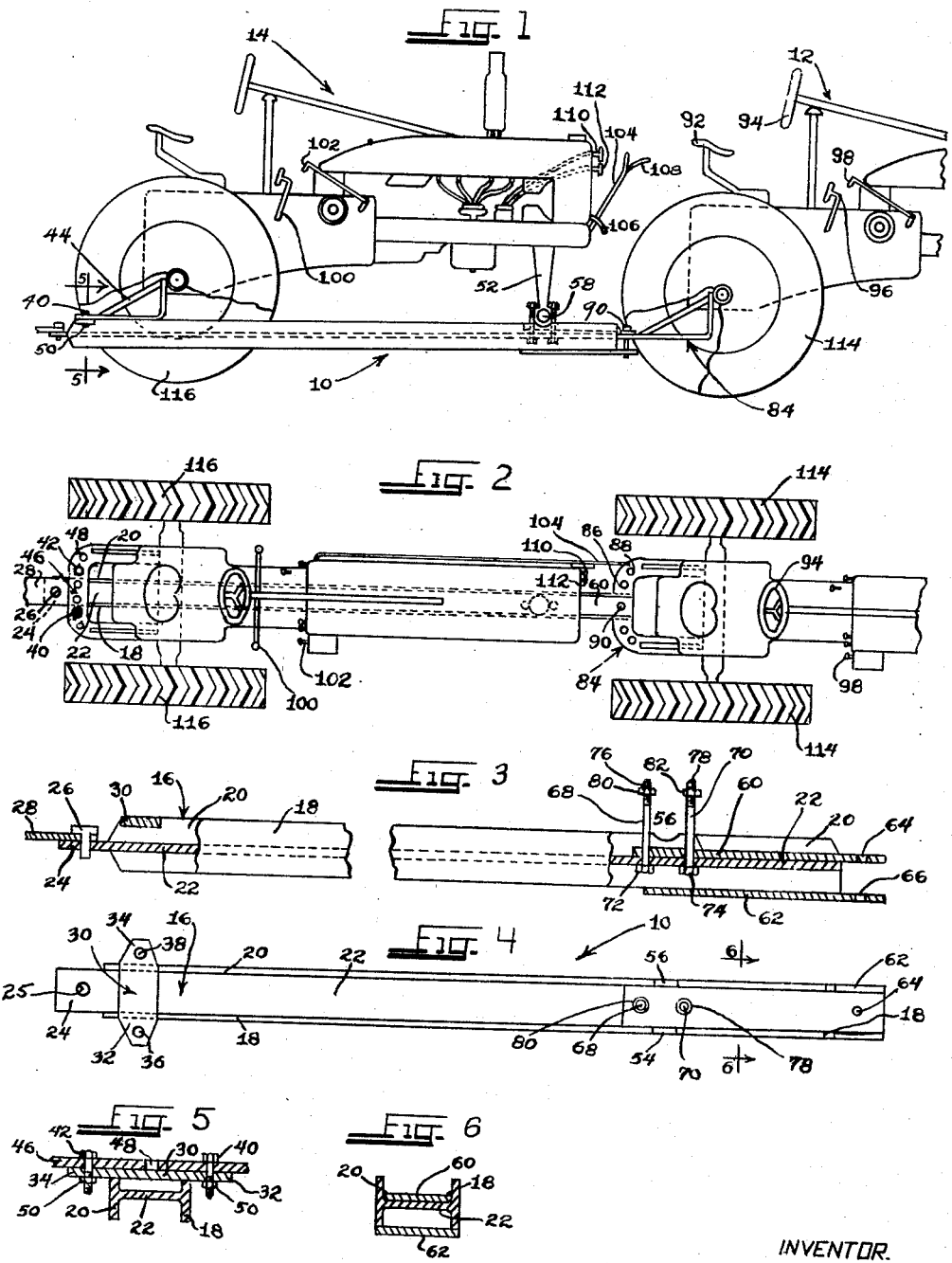
INVENTOR.
MARTIN S. GASPARDO
BY
Moore, Brangley
and Clayton
Atty's.

United States Patent Office 2,849,073
Patented Aug. 26, 1958

2,849,073

TANDEM HITCH FOR FARM TRACTORS

Martin S. Gaspardo, Long Point, Ill.

Application May 14, 1956, Serial No. 584,849

5 Claims. (Cl. 180—14)

This invention relates to hitch and coupling constructions and particularly to hitch and coupling constructions for interconnecting two tractors for operation by one man.

Many medium size farms now have two or more tractors of the small or medium power class, i. e., tractors having from 25 to 50 horsepower. Such tractors are limited by their power to operation of relatively small tools. When combined and interconnected, such tractors will produce 50 to 100 horsepower which is sufficient to pull most of the larger tools which are now designed to be drawn by large diesel crawler type tractors.

The use of large tools conserves money and manpower but most farms cannot afford to have the large tractors necessary to draw such tools. Furthermore, large tools speed up work when time is of the essence and particularly when time is limited due to short cultivating seasons. Therefore, it is desirable to interconnect two or more smaller tractors in such a manner that they can be operated by a single man to pull the large tools.

Accordingly, it is an important object of the present invention to provide an improved hitch and coupling construction which will permit interconnection of two or more small or medium sized tractors in such a manner as to permit drawing of large tools.

Another object of the invention is to provide a hitch and coupling construction of the type set forth which evenly distributes the pulling load and strain between the two tractors interconnected during operation.

Still another object of the invention is to provide a hitch and coupling construction of the type set forth which can be conveniently operated by a single man thereby greatly reducing labor costs.

Yet another object of the invention is to provide an improved hitch and coupling construction which gives firm and positive control over the second tractor and which will increase the effective pull of the second or rear tractor due to the fact that the first tractor has established a track thereby increasing the traction of the second or rear tractor.

A further object of the invention is to provide an improved hitch and coupling structure wherein the need for wheel weights on the front tractor is eliminated by adding the weight of the front end of the rear tractor to the drive wheels of the front tractor.

These and other objects and advantages of the invention will be better understood from the following description when taken in conjunction with the accompanying drawing. In the drawing wherein like reference numerals have been utilized to designate like parts throughout:

Figure 1 is a side elevational view with certain parts broken away showing the hitch and coupling construction made in accordance with and embodying the principles of the present invention interconnecting two medium sized tractors;

Figure 2 is a plan view of the assembly illustrated in Figure 1 of the drawings;

Figure 3 is an enlarged partial view with certain portions broken away of the hitch construction of the present invention;

Figure 4 is a plan view of the hitch construction of Figure 3;

Figure 5 is a fragmentary enlarged view in vertical section through the hitch construction substantially as seen in the direction of the arrows along the line 5—5 of Figure 1; and Figure 6 is a view in vertical section through the hitch construction of Figure 4 substantially as seen in the direction of the arrows along the line 6—6 of Figure 4.

Referring to the drawing and particularly to Figures 1 and 2 thereof, there is shown a hitch construction generally designated by the numeral 10 made in accordance with and embodying the principles of the present invention. Hitch 10 is shown interconnecting a first or forward tractor generally designated by the numeral 12 and a second or rear tractor generally designated by the numeral 14. Tractors 12 and 14 have been illustrated as medium sized tractors of the type which are commonly found on small independent farms. It is to be understood that other forms of tractors and other sizes of tractors can be utilized advantageously with the present invention.

The details of construction of hitch 10 can be better understood by reference to Figures 3 to 6, inclusive, of the drawing. It will be seen that hitch 10 includes in general an I-beam generally designated by the numeral 16 and including a pair of normally vertically disposed sides 18 and 20 interconnected by a web 22 disposed substantially along the median line of sides 18 and 20. Preferably web 22 extends rearwardly past sides 18 and 20 to provide a connecting portion 24 having an aperture 25 therein to receive a pin 26. Pin 26 serves to connect an implement drawbar 28 to web connecting portion 24.

Means is provided to interconnect the left hand end of hitch 10 to tractor 14 in a secure manner. More specifically, a cross plate 30 is set in notches formed along the upper edges of sides 18 and 20 and is suitably welded thereto. The ends of cross plate 30 extend beyond sides 18 and 20 to provide attachment members 32 and 34. Attachment members 32 and 34 are each apertured as at 36 and 38, respectively, to receive bolts 40 and 42, respectively (see Figure 2).

The rear tractor 14 is provided with the usual drawbar 44 having a transverse connecting portion 46 provided with a plurality of apertures 48 therein. The apertures 36 and 38 in cross bar 30 are so spaced as to align with a pair of apertures 48 in drawbar 44. The bolts 40 and 42 pass downwardly through one of apertures 48 and through apertures 36 and 38, respectively. Nuts 50 are provided on the lower threaded ends of bolts 40 and 42 whereby to secure drawbar 44 to hitch 10.

As can be seen from Figures 1 and 2 of the drawing, hitch 10 extends under the rear tractor 14 and under the post 52 upon which ordinarily are mounted the forward wheels for tractor 14. It will be seen that the front wheels have been removed from post 52 when utilizing the present invention. Each of sides 18 and 20 is provided with a part-circular cut-out or groove 54 and 56, respectively, which are adapted to receive front axle 58. The grooves 54 and 56 aid in maintaining axle 58 properly positioned along hitch 10.

Web 22 beneath the axle 58 is reinforced by a plate 60 which extends forwardly beyond the end of web 22 and forms a part of a connecting clevis. Another plate 62 is secured as by welding to the lower edges of sides 18 and 20 and forms another portion of the clevis. Aligned apertures 64 and 66 complete the clevis and provide means for connecting hitch 10 to the forward tractor 12 as will be described more fully hereafter.

Web 22 and plate 60 have formed therein two sets of aligned apertures disposed on either side of the recesses or grooves 54 and 56. Extending upwardly through these aligned apertures are bolts 68 and 70 having heads 72 and 74, respectively, which bear against the under side of web 22. The outer ends of bolts 68 and 70 are threaded as at 76 and 78 and carry thereon nuts 80 and 82. Bolts 68 and 70 in operation are disposed on opposite sides of axle 58 and the nuts 80 and 82 are threaded down against the axle to prevent inadvertent movement of the front end of tractor 14 upwardly away from hitch 10.

The forward tractor 12 is provided with the usual drawbar 84 having a cross bar 86 provided with a plurality of apertures 88. Connection is made between hitch 10 and drawbar 84 in the following manner. The apertured ends of plates 64 and 66 are disposed above and below cross bar 86, respectively, and a pin 90 is inserted through aligned apertures 64 and 66 and an appropriate aperture 88 in cross bar 86. This provides a positive connection between hitch 10 and the forward tractor 12.

It is desirable for the operator to be seated upon the seat 92 of the forward tractor 12 in position to operate the steering wheel 94, clutch 96, the throttle 98 and the other necessary controls. It further is desirable that the operator while seated on seat 92 can operate effectively the controls on the rear tractor 14. More specifically, it is desirable that the operator while seated on seat 92 be able to control the clutch 100, the throttle 102 and the ignition switch on tractor 14. To this end interconnection is made from clutch 100 to a handle 104 mounted on the forward end of tractor 14 and within easy reach of an operator seated upon seat 92. Handle 104 cooperates with a toothed rack 106 by means of a latch actuated by a movable handle 108. Interconnection is also made from throttle 102 to an auxiliary throttle control 110 mounted on the forward end of tractor 14. Auxiliary connection is also made from the ignition switch of tractor 14 to an operating handle 112 on the forward end of tractor 14. An operator seated on seat 92 therefore can accurately and positively control all the important operating functions of the rear tractor 14 without leaving seat 92.

The hitch 10 illustrated in the drawing effectively distributes the strain and pulling load between tractors 12 and 14. The implement to be drawn (not shown) has the drawbar 28 thereof connected to the rear end of hitch 10. Since there is a positive connection between drawbar 44 of the rear tractor 14 and hitch 10, rear tractor 14 contributes its fair share of the pulling power to draw the implement. The forward end of tractor 14 in effect rests upon the drawbar 84 of forward tractor 12 and therefore the weight of the forward end of tractor 14 is applied to increase the traction of the rear wheels 114 on forward tractor 12. This eliminates the need for wheel weights on tractor 12. Such wheel weights are expensive and troublesome in operation.

As can be best seen from Figure 2 the wheels 116 of rear tractor 14 roll in the tracks formed by wheels 114 on the forward tractor 12. This increases the pull of the rear tractor in operation. The positive interconnection of the two tractors also eliminates any danger of either tractor "running wild."

Although a certain preferred embodiment of the invention has been shown for purposes of illustration, it is to be understood that various changes and modifications can be made therein without departing from the spirit and scope of the invention. Accordingly, the invention is to be limited only as set forth in the following claims.

I claim:

1. A hitch construction for interconnecting two tractors in alignment, each tractor having a drawbar, comprising an I-beam adapted to be disposed beneath the rear tractor and extending forwardly and rearwardly therefrom, a pair of vertically spaced apart plates mounted on and formed integral with said I-beam and extending forwardly therefrom for connection to the drawbar of the front tractor, a cross bar mounted adjacent the other end of said I-beam and formed integral therewith for attachment to the drawbar of the rear tractor, retaining members mounted on said I-beam intermediate the ends thereof to receive and retain the front wheel post of the rear tractor, and a connecting portion formed integral with said I-beam at said other end thereof.

2. A hitch construction for interconnecting in alignment two tractors each having a drawbar comprising an I-beam including a pair of vertically disposed sides and a horizontally disposed web interconnecting said sides, a pair of plates mounted on said I-beam and extending outwardly therefrom parallel to said web and having aligned apertures therein disposed outwardly from said I-beam for interconnection to the drawbar of the front tractor, a transverse plate mounted on said I-beam adjacent the other end thereof and having apertures therein for connection to the drawbar of the rear tractor, and an extension mounted on the other end of said I-beam and extending rearwardly with respect to the second tractor in assembled position to provide an implement connection, said sides having grooves therein to receive the front wheel post of the rear tractor.

3. A hitch construction for interconnecting in alignment two tractors each having a drawbar comprising an I-beam including a pair of vertically disposed sides and a horizontally disposed web interconnecting said sides intermediate the edges thereof, a first plate mounted on said web adjacent one end thereof and extending beyond said one end, a second plate mounted on said sides adjacent said first plate and spaced therefrom and extending beyond the adjacent end of said web, the portions of said first and second plates extending beyond said web having aligned apertures therein for attachment to the drawbar of the front tractor, a transverse plate mounted upon said sides adjacent the other end thereof and extending beyond the edges of said sides, said transverse plate having a pair of apertures therein for attachment to the drawbar of the rear tractor, an extension formed on said web and extending outwardly therefrom at the end of said web opposite said first plate, said extension having an aperture therethrough to provide a connection for an implement, said sides adjacent said plates having grooves therein to receive the front wheel post of the rear tractor, and a pair of bolts extending through said web and said first plate on opposite sides of said grooves to engage and retain the front wheel post of the rear tractor.

4. A farm power unit comprising a first tractor having a drawbar, a second tractor having a drawbar and a front wheel post, an I-beam disposed beneath said second tractor and extending forwardly and rearwardly therefrom, a pair of vertically spaced apart plates mounted on and formed integral with said I-beam and extending forwardly therefrom and connected to the drawbar of said first tractor, a cross bar mounted adjacent the other end of said I-beam integral therewith and connected to the drawbar of said second tractor, retaining members mounted on said I-beam intermediate the ends thereof to receive and retain the front wheel posts of said second tractor, and a connecting portion formed integral with said I-beam at said other end thereof behind the drawbar of said second tractor.

5. A farm power unit comprising a first tractor having a drawbar, a second tractor having a drawbar and a front wheel post, an I-beam disposed beneath said second tractor and extending forwardly and rearwardly therefrom, said I-beam including a pair of vertically disposed sides and a horizontally disposed web interconnecting said sides, a pair of plates mounted on said I-beam and extending forwardly therefrom parallel to said web and having aligned apertures therein disposed outwardly from said I-beam, the drawbar of said first tractor being disposed between said plates and having an aperture in alignment with the apertures in said plates, a pin passing through said apertures to interconnect said I-beam and the drawbar of said first tractor, a transverse plate mounted on said I-beam adjacent the other end thereof and having spaced apart apertures therein, bolts passing through said apertures in said transverse plate and through aligned apertures in the drawbar of said second tractor to interconnect said I-beam and the drawbar of said second tractor, said sides having grooves therein to receive the front wheel post of said second tractor, and an extension formed on said web and extending rearwardly therefrom behind the drawbar on said second tractor for attachment to an implement.

References Cited in the file of this patent

UNITED STATES PATENTS

| | | |
|---|---|---|
| 1,310,604 | Burgess | July 22, 1919 |
| 1,336,305 | Lines | Apr. 6, 1920 |
| 1,342,507 | McNamara | June 8, 1920 |
| 1,422,709 | Hodgson | July 11, 1922 |
| 1,450,068 | Fakerskog | Mar. 27, 1923 |
| 2,150,066 | Kalb | Mar. 7, 1939 |
| 2,429,492 | Scranton | Oct. 21, 1947 |
| 2,551,725 | Christiansen | May 8, 1951 |
| 2,727,581 | Wright | Dec. 20, 1955 |

FOREIGN PATENTS

| | | |
|---|---|---|
| 828,049 | Germany | Jan. 14, 1952 |